United States Patent
Seppälä

(10) Patent No.: US 8,563,664 B2
(45) Date of Patent: Oct. 22, 2013

(54) CROSSLINKABLE BIOPOLYMER

(75) Inventor: Jukka Seppälä, Helsinki (FI)

(73) Assignee: JVS-Polymers Oy, Espoo (FI)

( * ) Notice: Subject to any disclaimer, the term of this patent is extended or adjusted under 35 U.S.C. 154(b) by 772 days.

(21) Appl. No.: 11/667,929

(22) PCT Filed: Nov. 3, 2005

(86) PCT No.: PCT/FI2005/000471
§ 371 (c)(1), (2), (4) Date: May 17, 2007

(87) PCT Pub. No.: WO2006/053936
PCT Pub. Date: May 26, 2006

(65) Prior Publication Data
US 2008/0004369 A1    Jan. 3, 2008

(30) Foreign Application Priority Data
Nov. 17, 2004  (FI) .................................... 20041476

(51) Int. Cl.
*C08G 63/08*  (2006.01)

(52) U.S. Cl.
USPC ........ 525/450; 525/35; 522/165; 252/182.13; 252/182.18; 528/354

(58) Field of Classification Search
USPC .................. 525/35, 450; 252/182.13, 182.18; 522/165; 528/354
See application file for complete search history.

(56) References Cited

U.S. PATENT DOCUMENTS

| | | | |
|---|---|---|---|
| 6,001,891 A | 12/1999 | Higuchi et al. | 522/104 |
| 6,187,901 B1 | 2/2001 | Koskinen et al. | 528/483 |
| 6,214,967 B1 | 4/2001 | Jansson et al. | 528/354 |
| 7,256,250 B2 | 8/2007 | Tuominen et al. | 528/272 |
| 2005/0080223 A1* | 4/2005 | Tuominen et al. | 528/272 |

FOREIGN PATENT DOCUMENTS

| | | | |
|---|---|---|---|
| EP | 0 812 868 A1 | | 12/1997 |
| FI | 103 978 B | | 10/1999 |
| FI | 107 337 B | | 7/2001 |
| FI | 115 217 B | | 3/2005 |
| JP | 07-133331 | * | 5/1995 |
| WO | WO 03/033563 | * | 4/2003 |

OTHER PUBLICATIONS

Helminen et al. "Structure Modification and crosslinking of Methacrylated Polylactide Oligomers", J. Appl.Polym. Sci, vol. 86, pp. 3616-3636, Dec. 2002.*

* cited by examiner

*Primary Examiner* — Frances Tischler
(74) *Attorney, Agent, or Firm* — Kubovcik & Kubovcik

(57) ABSTRACT

A composition, prepolymer and method to produce a polymer based on biodegradable or essentially renewable crude materials, which can be crosslinked by free radicals. The composition is based on polyesters that are functionalized with unsaturated monomer units, in a way that unsaturated groups can be located along the polymer main chain as well as at the ends of the prepolymer. In connection to the product production, the prepolymer is exposed to free radicals that leads to network formation. The composition of the crosslinked biopolymer can be adjusted from a stiff engineering material to an elastic rubbery material. The new biopolymer can be used in composite materials, dispersions, barrier materials, rubbery materials, biomedical applications, and the like.

28 Claims, 1 Drawing Sheet

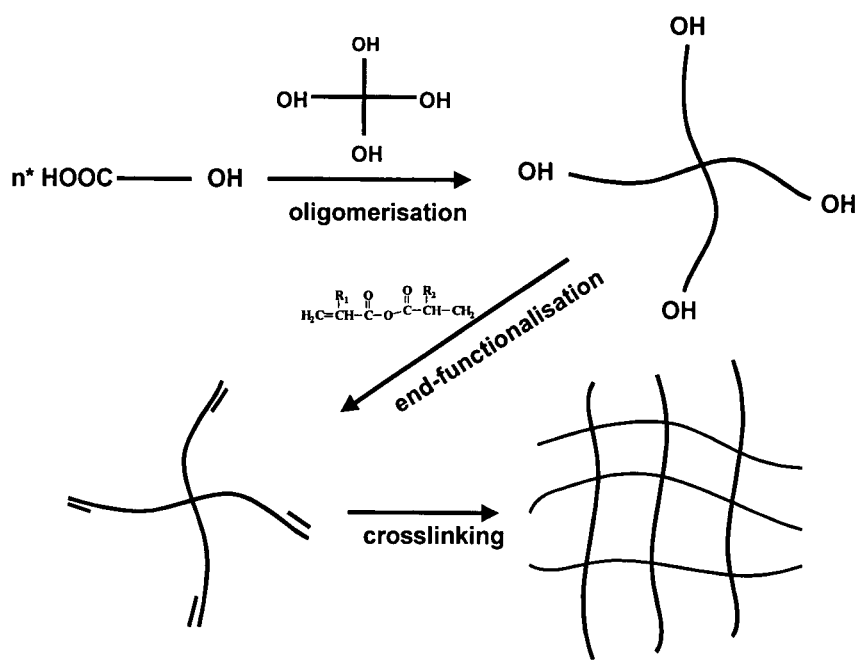

CROSSLINKABLE BIOPOLYMER

The object of this invention is biodegradable crosslinked polymer, which is made from hydroxy acid or diacids and diols, end-group modifiers, components bringing unsaturated site to end-groups and possibly components to modify properties, and a method for its manufacture.

With growing environmental problems the interest in biodegradable and compostable polymers has increased. Such polymers can be used for example in disposable products, packages, as paper coatings and to wrap compostable, whereby composting would be an alternative to recycling or incineration to deal with plastics waste. The high price of biodegradable plastics limits, however, their use in packages and other bulk applications.

The markets for biodegradable polymers have grown during the last years and they will expand significantly in the coming years. The reason for growth is partly a growing awareness on the side of the consumer of the increase in landfill waste due to packaging, and partly the tightening legislation for recycling, and a concern for a decrease in the non-renewable oil resources used in the production of traditional polymers. The use of renewable natural resources is then a significant competitive advantage. Especially the lactic acid used as the raw-material for the lactic acid polymers is made from renewable natural resources; carbon source used in the fermentation to lactic acid is starch or sugar, and often the use of byproducts or wastes from agriculture is attempted.

Different coatings are used in huge quantities to coat paper, cardboard, textiles, wood, metals and polymers. With the coating one strives to improve the product properties of the substrate, such as barrier properties, for example water or fat retention, and special durability properties, e.g. water resistance. The coatings usually comprise a viscous three-component system: a film forming binder, a pigment, and a volatile solvent. These coatings are used either as solutions or dispersions in the coating applications. The binders in most coatings are either high molar mass non-reactive organic polymers, or low molar mass reactive polymers, which are further polymerised.

Biodegradable plastics are usually understood to be polymers that by the influence of microbes or moisture degrade to non-harmful small molecular compounds (mainly carbon dioxide and water). The biopolymers are usually divided into natural and synthetic polymers. To the group of natural polymers belong, i.a. proteins and polysaccharides (starch and cellulose based). Synthetic biopolymers are aliphatic polyesters, polyanhydrides, polyorthoesters, water soluble polyvinyl alcohols and some polyurethanes. Biopolymers can also be produced with the help of microbes (e.g. polyhydroxy alkanoates). The most important group of biodegradable plastics comprises aliphatic polyesters, the biodegradation of which largely is based on hydrolysable ester bonds.

Among the polyesters one can mention polyglycolide, polylactide, and polycaprolactone and the bacterially made polyhydroxy butyrate and valerate. The polyesters are usually prepared from hydroxyl acids or diacids and diols. For the aliphatic polyesters to have adequate mechanical properties their molar masses have to be fairly high. The most common means to achieve a high molar mass is to prepare the polyester by a ring-opening polymerisation of lactones.

Lactic acid is one of the potential raw materials for biodegradable commodity polymers. Lactic acid is produced from renewable natural materials (e.g. barley, potato, corn/maize) by fermentation. The polymers of lactic acid are thermoplastic, biodegradable polyesters. Poly(lactic acids) (PLA) can be processed with common plastic processing equipment, and they have good mechanical and barrier properties in package applications. PLA is rapidly and completely degraded in composting conditions to biomass, water and carbon dioxide.

The fields of use for polylactides are disposable plates, cups and cutlery, packages for products and technical items, agricultural films and other gardening products, paper and cardboard coating products and products in hygiene and public health. The polymers of lactic acid are also non-toxic, biocompatible materials, and they are used in many applications within orthopaedics, odontology, pharmacy and surgery (e.g. bone screws and sutures).

The condensation polymerisation between the hydroxyl and acid groups of lactic acid monomers does not produce polymers of sufficiently high molar mass so that their mechanical properties would be adequate. Consequently, three main routes are used in the manufacturing, all of which, however, utilise condensation polymerisation. In the coupling polymerisation method for lactic acid the lactic acid monomers are first polycondensed to low molar mass oligomers, which in the second stage are coupled to each other by the use of different coupling agents, such as di-isocyanates, di-epoxies or bis(2-oxazolines). These coupling methods are described, i.a., in the patent publication U.S. Pat. No. 5,470,944. The increasing of the molar mass by increasing coupling reactions demands that the reactive end-groups of the lactic acid oligomers usually are of the same type (either hydroxyl or acid ends). This requirement can be achieved by using long polymerisation times and a low pressure in the condensation reactor, which, however, significantly increases the manufacturing costs. In addition the amount of the by-product, lactide, increases and the yield of the lactic acid oligomer decreases when the polymerisation time is increased.

In the mostly used method cyclic dimers of lactic acid, lactides, are prepared from the oligomers, and they are polymerised to polylactide by ring-opening polymerisation. Production of polylactide by the ring-opening mechanism via the lactide phase yields a high molar mass polymer, but it requires many steps and extremely pure starting materials. Since Carothers presented this polymerisation method in 1932 several papers have been published describing how to improve the polylactide process: (a) Methods for making pre-polymers required for manufacture of lactide are presented, e.g., in U.S. Pat. No. 5,357,034; (b) production of crude lactide is shown, i.a., in U.S. Pat. No. 5,357,035; (c) purification of crude lactide to lactide in the patent publication WO9631506; (d) several types of polymerisation methods to polymerise lactide to polylactide are known, for example the one presented in the patent publication FI970651; and (e) removal of residual monomer from polylactide is described in the publication FI970649. In addition, the high temperatures required for processing of thermoplastic polylactide demand (f) thermal stabilisation, which has been described in, i.a., U.S. Pat. No. 5,338,822. However, these several steps (a-f) in the production of polylactide and their subprocesses require many different, often complicated and expensive process equipment, and the total yield of final polylactide from lactic acid often tends to be relatively low, too.

In addition to the above mentioned methods a solvent process based on azeotropic distillation is presented in the US patent publication (U.S. Pat. No. 5,310,865, 1994), in which method lactic acid is polyconsenced directly to poly(lactic acid). Lactic acid is polymerised in the presence of a catalyst in some organic solvent, such as anisole or diphenyl ether. The organic solvent forms with water an azeotropic mix, by which water can be removed from the reaction mixture, and thus the polycondensation equilibrium is pushed towards the polyester.

In optimised conditions high (up to 300000 g/mol) molar masses have been achieved. In the mentioned process solvents are used, however, the use of which, and their purification to the required level, and the separation of the final product from the solvents are economically unfavourable. Additionally relatively high catalyst concentrations have to be used in the process.

In addition to the above described manufacturing methods for thermoplastic biopolymers, thermoset biodegradable polymers can be made. In the U.S. Pat. No. 4,502,976 is described the manufacture of a bioerodible water soluble hydrogel by condensation of an unsaturated aliphatic or cyclo-aliphatic dicarboxylic acid or diol, a water soluble polyglycol and a dicarboxylic acid. The aim in the invention is for a medical hydrogel, which type of polymer is not suitable as a coating or barrier material because of its water solubility. In the U.S. Pat. No. 4,843,112 a crosslinkable biodegradable bone cement is presented, a blend of poly (propylene glycol fumarate), ceramics and salts, manufacturing method by condensation and crosslinking with methyl methacrylate.

In addition, the U.S. Pat. No. 4,888,413 presents for medical purposes a poly(propylene glycol fumarate) with a molar mass of 500-3000 g/mol, whereas the EP patent publication EP812868A1 presents a crosslinked polyester based on an unsaturated multi-functional acid (poly(glycol fumarate)) with a molar mass of more than 15000 g/mol. Several other publications describe methods in which compounds with double bonds are linked to known biodegradable polymers by addition, after which they are crosslinked; for instance maleic acid anhydride has been linked to the hydroxyl end-groups of polycaprolactone. The weakness of these methods is the steps in the ring-opening polymerisation process and further the high demand of conversion on the following addition reaction, which add to the manufacturing costs. In the methods described above it has mainly been the aim to get medical materials compatible with the human organism and priority has not been on the price of the raw-materials for the polymers, complicated reaction systems nor on their biotechnical means of production. Furthermore, the patents described are not based on such biopolymers, which compose of prepolymers produced by polycondensation and thereafter end-functionalised prepolymers, and which then in the second stage can be crosslinked, thus they do not correspond to the chemical composition in the method and the properties generated equivalent to the present invention. In addition, furthermore the polyesterification reaction is often performed in an organic solvent, which adds to the costs of a high volume production. The weakness of the said materials for industrial high volume production, such as polymer production for making coatings and objects, is thus that they are not applicable due to their chemical composition, high costs of raw-materials, complicated production processes and their material properties.

Finnish patent application 20011999 describes composition and manufacturing method for biopolymer, which is essentially based on hydroxy acids and is crosslinkable by its double bonded monomer units copolymerized into the polymer structure during condensation stage. Such crosslinked polymer, however, has plenty of —OH and possible —COOH end-groups left which results the water sensitivity and hydrophilicity of the polymer. Furthermore, the crosslinking degrees often remain lower than is needed in perspective of obtaining high mechanical toughness properties.

To this level of technique, is surprisingly done an invention, where the crosslinking can be essentially improved by treating the prepolymer end-groups, partly or entirely, with units containing double bonds. Alternatively, the end-groups can be treated with end-blockers containing saturated chain. Attainable advantage of the present invention method compared to presented composition and method in FI 20011999 is better crosslinking and reduction or removal of free hydrophilic end-groups. Due to these remarks, significant advantage is surprisingly achieved in curing speed, mechanical properties, temperature resistance, strain resistance, water resistance and hydrophilicity and resistance to hydrolysis as well the grease resistance. Highly noteworthy invention concomitant to the method is that composition according to the invention is possible to manufacture even without the use of reduced pressure, which enables very easy and advantageous technical production method carried out in one reactor. Typical composition and chemical structure according to the invention is presented in the FIG. 1, not however excluding other structures based on the invention.

SUMMARY OF THE INVENTION

The purpose of the present invention is to make from lactic acid a new type of a biodegradable crosslinked polymer, which differs essentially by its material composition, its manufacture and use from earlier presented inventions. One of the aims of the invention is also to produce the mentioned product by a method which is simpler than previous ones.

A furthermore an objective is to eliminate typical drawbacks of lactic acid polymers, essentially the unsatisfactory heat tolerance and brittleness of the materials.

The purpose is that in the manufacture of the polyester, starting materials which are mainly or at least remarkably based on renewable raw materials can be used.

An additional objective is that no by-products such as lactide are removed in the polycondensation reaction from the reaction vessel, thus improving the yield of the product. Furthermore the objective is that the product generated in the polyesterification has not to be purified from monomer residues or other impurities.

A further aim is, that by mixing into the polyester resin a reactive macromonomer it is possible to even more improve the properties of the product and its usability. Now it has surprisingly, been observed that these objects are fulfilled by the crosslinked polymer of the present invention as prepared by the methods described herein.

The polymer resin according to the invention is manufactured by condensation polymerisation of a hydroxy acid, such as lactic acid. In the polymerisation is further used itaconic acid or itaconic anhydride, di- or polyfunctional alcohol. It is also possible to use other comonomers in the polycondensation if different properties are desired for the product, such as elasticity. It is possible to add, before the application, a reactive macromonomer to the prepared and still reactive low molar mass polyester resin. In the application to the substrate typical polymer coating and dispersion coating techniques may be used, such as engraved roll coating, spray coating or a layer formation by use of a set of rolls. Crosslinking of the resin to a high molar mass crosslinked polymer takes place by heat, radical producing compounds, UV or VIS light or other radical exposure.

By using the biodegradable thermoset plastic being the object of this invention it is believed that wider operating temperature ranges and improved penetration properties can be achieved compared to thermoplastic biopolymer coatings. It is also possible to tailor the mechanical properties of the end-products from hard to elastic.

The polymer resin according to this invention can be cured and processed by using traditional processing methods for thermoset plastics. Processing at normal pressure include hand laying, spraying, continuous lamination, casting, rotational moulding and making of pipes and containers using a rotating mould. Methods based on compression are compression and transfer moulding (RTM), 10 injection moulding (RIM) and pultrusion. Particularly economical processing method is deep drawing and thermoforming.

The new polymers have a wide field of applications. The polymer can be used as a coating on packages, sacks, bags and films, made of paper, cardboard, cellulose, starches and recycled fibres. Formed pieces moulded according to methods mentioned above as well as heat and blow moulded packages, sacks, bags and bottles can be produced from them. Furthermore, they can be used in the manufacture of expanded plastics products, cellular plastics and foams that can be used as cushioning in packages. One advantageous application field according to the invention is different types of composite materials, where filler or reinforcement components are combined with the polymer according to the invention. Advantageous fields of applications to mention are also layered boards, particle boards and similar products, veneers, hardboards and impregnated papers. Also, an advantageous field of application is manufacture of composite materials and structures based on the biopolymer. Particularly one object to mention is the possibility to produce plastic processing to materials based on paper boards or papers or cellulose fiber materials. From the polymer resin according to this invention can be prepared dispersions and emulsions which can further coat paper or paper board or other materials or they can be used as glues. The list described above contains some typical fields of applications, however, not outlining other possible applications of the invention. Crosslinkable polymer according to the invention can be advantageously used as glue, binder or barrier layer.

They are also applicable as coatings or matrices for controlled release fertilisers, plant protection agents, insecticides and pharmaceutics. Furthermore, one advantageous field of application for materials according to the invention are pharmaceutical applications and surgery, where particularly biocompatibility and biodegradation are advantages in the applications of tissue engineering and controlled active agent and drug release. In the applications of tissue engineering to the polymer according to the invention can be blended components increasing the bioactivity such as bioactive glass or hydroxy apatite or other active substances or drugs or biologically active components and further, porosity can be produced to the polymer with several different techniques.

The invention is based on the idea that the polyester resin is hardened to a solid, thermoset type material by a crosslinking or curing reaction. Additionally the option prevails to add in the preparation stage to the reaction mixture a monomer containing a flexible main chain, such as an ε-caprolactone comonomer. The object of the caprolactone units is to induce flexibility to the material, to decrease the glass transition temperature, and, by decreasing the melt viscosity, to act as an internal plasticiser. Caprolactone is an advantageous comonomer in the sense that it is biodegradable, and thus the biodegradablity of the end-product is maintained.

The process according to the invention is basically a two stage one, where the first stage comprises polymerisation of the resin, in which from lactic acid and possible not compulsory from comonomer such as itaconic acid either a linear or star shaped polyester with a desired molar mass can be made in a reasonable time, keeping formation of side products low. The di- or multifunctional alcohol has an important role in tailoring the molar mass and molecular structure. Selection of alcohol component can influence the rigidity of chain, glass transition temperature and hydrophilicity and by that the water retention.

Special example of method according to the invention is to use betulin as difunctional alcohol. Betulin also known as betulinol, which occurs abundantly in the bark of birch, is biomass based bulky steroid type of diol, which also has a double bond. Now it is surprisingly observed to be useful in the polymer structure according to the invention.

Central parameters in the method are the monomer ratios, the polymerisation temperatures, the temperature increase profile, the methods to remove the condensation water, the comonomers and the catalysts.

Further essential improvement according to this invention to the previous level of technique is that the linear of branched prepolymer manufactured by direct polycondensation can be end-functionalised during the condensation reaction or in the end of it in a separate reaction so that end-groups of prepolymers are not any longer —OH or —COOH functional groups. Hydroxyl end-groups can be converted for example by treatment with a dianhydride to unsaturated reactive double bonds. Typically, however not outlining the applicability of technique can be mentioned a dimethacrylic anhydride as advantageous end-group modifier. Attainable advantage is then that the crosslinking of polyester polymer manufactured by direct condensation improves. In other words, its crosslinking speed increases and crosslinking degree increases which have huge significance considering industrial production processes and mechanical strength abilities of end-products, such as tensile strength, impact strength, creep resistance and high temperature resistance just to mention a few. Furthermore, according to the invention, by end-functionalisation and changing the character of the prepolymer it is surprisingly observed that is possible to influence favourably the reduction of the water and grease absorbance of both the prepolymer and crosslinked end-products which facts are important among others in both technical and package applications. In consequence, surprisingly prepolymer without end-group modification when immersed in water absorbs water already in few hours changing simultaneously to soft toffee-like mass. While, a composition according to the invention is completely water proof when its end-groups have been treated with a method according to the invention. Similarly, grease absorption character is extremely low. Same consequence is achieved when end-functionalised prepolymer is crosslinked. This characteristic have crucially important technical significance considering the applicability of directly polycondensated poly(lactic acid) as technical material. One advantageous new possibility for such a material opens in the production of dispersions and emulsions, where water is the medium substrate and therefore a good resistance of water is needed already in the prepolymer stage.

Furthermore, it has been surprisingly noted, that treatment of end-groups can be also done, partly or entirely, by saturated components while affecting only on the hydrophilic character but not adding up the crosslinking. In this case, the treatment of end-groups can be done with compounds for example acetic acid, other organic acids and their different anhydrides, fatty acids such as pine oil, castor oil and linoleic acid to mention a few.

Furthermore, it is also possible to perform the treatment of end-groups with isocyanates or in the case of —COOH end-groups also with alcohols or epoxy compounds.

In the second stage of the method a crosslinked polyester with a high molar mass is formed by crosslinking the resin, using a radical forming compound such as a peroxide. Initiation of the reaction is achieved by heat, light, by radiation or by redox-initiation. Central elements at this stage are the mixing temperature, crosslinking temperature, uv curing parameters, used crosslinking agents and their amount, accelerators, inhibitors and the technical solutions (heat, light and their combinations) of crosslinking.

When needed, it is possible to add to the prepared reactive polyester resin a reactive macromonomer before the cross linking of the second stage of the process. As defined in the invention, the reactive macromonomer can be a small molar mass polymer made from a hydroxy acid and possibly other comonomers, itaconic acid and a polyol. By its use application can be eased by reducing the melt viscosity, the level of crosslinking and the crosslink density can be influenced, and it can bring flexibility to the material.

The invention will be more closely looked at below with a detailed description and corresponding examples.

BRIEF DESCRIPTION OF THE SEVERAL VIEWS OF THE DRAWING

The drawing (FIG. 1) illustrates a typical method for preparing and the structure of a crosslinked polymer according to the present invention.

DETAILED DESCRIPTION OF THE INVENTION

The first stage of the method according to the present invention comprises the condensation polymerisation of the resin: In the polymerisation a polyester with a desired molar mass is prepared from (i) a hydroxy acid or a diacid and a diol, (ii) a functionalising agent which can be a diol or polyfunctional alcohol, or a dicarboxylic acid or polyfunctional carboxylic acid, and (iii) possibly other monomers such as ε-caprolactone, unsaturated components such as itaconic acid or other unsaturated difunctional monomers.

The hydroxy acid monomers used in the invention to prepare the resin are typically comprises α-hydroxy acids, β-hydroxy acids or lactones. It is especially advantageous to use aliphatic or aromatic a-hydroxy acid monomers, such as L-lactic acid or D-lactic acid or their mixtures (so called racemic D,L-lactic acid), glycolic acid, 6-caproic acid, L- or D-mandelic acid, L-lactide or D,L-lactide. The hydroxy acid monomers can also be multifunctional. Malic acid and citric acid can be mentioned as examples.

The unsaturated difunctional monomers used in the invention typically comprise unsaturated difunctional acids, such as itaconic acid, itaconic acid anhydride, maleic acid, maleic acid anhydride or fumaric acid, or unsaturated difunctional alcohols, such as 1,4-butenediol, 1-propene-1,2-diol, 2-heptene-1,7-diol, 3-heptene-1,7-diol, 2-hexane-1,6-diol, 3-hexane-1,6-diol, 1-pentene-1,5-diol or 2-pentene-1,5-diol or betulin alias betulinol.

Especially interesting is such an application of the invention in which the hydroxy acid and the unsaturated difunctional monomer are based on renewable raw materials and can be manufactured by biotechnical methods, such as L-lactic acid and itaconic acid.

The number of reactive groups and the amount of the functionalising agent used in the manufacture of the resin determine the molecular structure (e.g. linear or star shaped) and the molecule size (molar mass) of the resin formed in the polymerization. The functionalising agent to be used is typically a polyfunctional alcohol, such as butanediol, glycol, propanediol, hexanediol, penta-erythritol, mannitol, glycerol or different polyglycerols, or a multifunctional acid, such as 1,1,3-propane tricarboxylic acid, 1,1,2-ethane carboxylic acid or 1,2,3,4-cyclo-pentane tetracarboxylic acid or betulin alias betulinol.

Depending on the amount of starting materials the composition of the polyester resin is typically 20-99 mole % lactic acid and 80-1 mole % the functionalising agent and crosslinking agents. When a rubber-like ductility and elasticity is wanted, a desired quantity, typically 1-99 mole %, of a cyclic aliphatic lactone, e.g. ε-caprolactone, can be added into the mixture of hydroxy acid monomers. Correspondingly, when stiffness and high operating temperatures are wanted, mandelic acid can be added. The above percentage amounts are calculated on the total monomer quantity. Resins with star shaped structures can be prepared by using polyfunctional alcohols, such as pentaerythritol. Copolymerisation of pentaerythritol (PE), lactic acid (LA) and itaconic acid (IT) by a condensation reaction yields a polyester resin, which comprises the following construction units, however not excluding other possible structures:

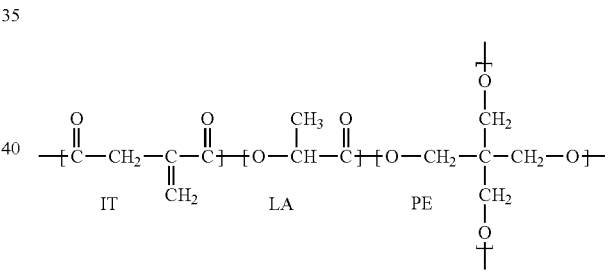

Elastic resins of star shaped structure can be prepared by copolymerisation of multifunctional alcohols, such as pentaerythritol (PE), lactic acid (LA), itaconic acid (IT) and ε-caprolactone (CL) by a condensation reaction. A polyester resin composed of the following construction units is then achieved, however not excluding other possible structures:

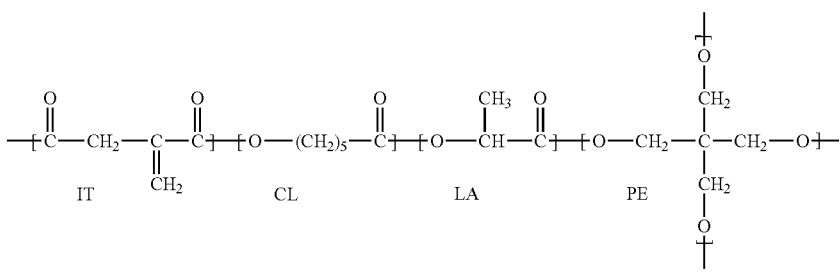

The properties of the resin can be adjusted by changing the ratios of the monomers used. The molar mass can be adjusted by changing the pentaerythritol-lactic acid ratio, and the crosslink density can be adjusted by changing the lactic acid-itaconic acid ratio. Additionally, also the elasticity of the resin, its degree of rubbery properties, can be adjusted by changing the resin composition, i.e. altering the amount of caprolactone.

Structurally linear crosslinkable resins can be prepared by using difunctional alcohols, such as 1,4-butanediol (BD). Copolymerising it with lactic acid (LA) and itaconic acid (IT) in a condensation reaction yields a polyester resin, which comprises the following structural elements, however not excluding other possible structures:

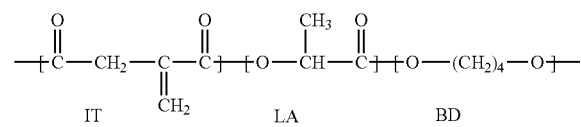

Advantageous crosslinking structures are achieved when polymerization is performed in two stages: In the first stage, the polycondensation is performed, and in the second stage, the end-groups are, partly or entirely, treated by unsaturated compound for example profitably with methacrylic anhydride, when for example the following structural elements are attained, however not excluding other possible ways to modify end-groups:

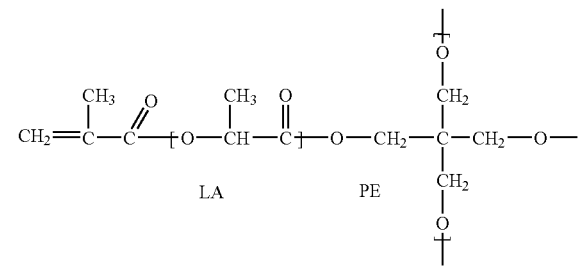

As above, the properties of the resin can be adjusted by changing the ratios of the monomers used. The molar mass can be tailored by changing the butanediol-lactic acid ratio, and the crosslink density can be adjusted by altering the lactic acid-itaconic acid ratio. Further, part of the lactic acid can be replaced with caprolactone, whereby the elasticity of the resin will increase. The polycondensation of lactic acid is an equilibrium reaction. In order for the polymerisation to proceed, the reaction equilibrium should be pushed to the side of the products. To move the equilibrium to the right, especially at the end of the reaction, is usually difficult, because the condensation water escapes extremely slowly when the viscosity of the reaction mixture increases. Shifting of the equilibrium is achieved by reducing the pressure, increasing the temperature and by the use of catalysts. When the polymerisation temperature exceeds 210° C., the breakdown of the polymer chains starts to limit the polymerisation rate. In addition, the molar mass of the poly(lactic acid) is decreased by depolymerisation, by which the harmful side-product lactide is formed, and its formation increases also substantially at temperatures above 220° C. Poly(lactic acid) with a high molar mass is very cumbersome to prepare by polycondensation without solvents, special catalysts and long polymerisation times. The reaction is also very sensitive to monofunctional impurities, which can act as chain terminators. Thus condensation polymerisation of lactic acid is usually limited to preparing polymers of low molar mass, typically 5000-20000 g/mole, (also called lactic acid oligomers). The number average molar mass of polyesters should be at least 25000-40000 g/mole for the product to have useful physical properties.

Remarkable invention concomitant to the method is, that surprisingly, compositions according to the invention are possible to manufacture even without any reduced pressure which enables highly easy and advantageous technical manufacture. This kind of manufacture is possible, because the crosslinking prepolymer does not always need to be in a high molar mass level, at which an application along with the method is possible, where reduced pressure is not used or only used slightly in the condensation reaction. In addition to its economical and technical simplicity, this method has an advantage that the vaporisation of the low molecular components is not so drastic, for example, the formation of lactide is minor in the case of lactic acid condensation.

The advantages of the present invention can be regarded to be that high molar masses in polymerising the resin are not strived at. Typically, the molar masses are between 500 and 10000 g/mole. Further, because the subreactions are based on reaction of the double bonds and not on subreaction of free end-groups, it is considered that bringing the reactions of the end-groups of the monomers in the reaction mixture to an end is not critical for this process. Hereby substantial process technical advantages are achieved, such as shorter polymerisation times, lower polymerisation temperatures, and easier low pressure conditions. An advantage of the invention is also that no solvents are needed in the polymerisation. Further, according to the method for manufacture in the invention it is possible to decrease formation of the side product, lactide, due to the monomer composition and lower polymerisation temperatures. Further, because the crosslinking reaction and the crosslink density depend primarily on opening of the double bonds, and not on the molar mass of the prepolymer, or on defined exact stoichiometric ratios between end-groups, the method gives the possibility to use also "food grade" or less refined and purified lactic acid.

The polycondensation reaction is autocatalysed by the acid groups in the monomers. When the reaction proceeds the concentration of acid groups decreases, however, and the reaction slows down. To avoid this it is recommended to use a catalyst in the polyesterification, usually 0.1 . . . 0.5 weight %. In the polycondensation of lactic acid, for instance protonic acids, Lewis acids, organometallic compounds, metal oxides and metal salts of titanium, tin, zirconium and lead can be used as catalysts.

During the polycondensation it is important to make sure that the double bonds do not polymerise with each other by a chain polymerisation and thus prematurely crosslink the polymer. Inhibitors added to the reaction mixture react with radicals to form inactive molecules. Thus a premature curing of the resin during the polycondensation reaction is blocked, and also the work time during application is prolonged. Due to the inhibitors it is further possible to extend the storage time of the polyester resins by several months or even years. Most commonly used inhibitors are quinones (e.g. p-benzoquinone, hydroquinone and 1,4-naphthoquinone), aromatic nitro-compounds (tri-nitrobenzene), sulphur, metal halides and copper compounds. Especially good inhibitors are such compounds that do not contain hydroxyl groups that might react with the monomers of the reaction mixture. Such are p-benzoquinone, 1,4-naphthoquinone and 2,5-diphenyl-p-benzoquinone. The amount of inhibitors is typically 0.01 ... 0.1 weight % of the resin.

When condensation proceeds to the desired level an —OH end-functionalised prepolymer is typically formed (or in the alternative procedure —COOH end-functionalised). These —OH groups can be converted, partly or entirely, to reactive double bonds by adding unsaturated acid, acid anhydride, acid chloride, isocyanate compound, alcohol or epoxy compound to the reactor. By using acid anhydride typical reaction time is 3 hours at temperature of 160° C., when anhydride is added directly to the condensation reactor. Treatment provides reactive oligomer with significant amount of double bonded end-groups.

Production of the resin, or the condensation polymerisation of lactic acid, can be made in any equipment that is fit for esterification reactions. According to one preferable alternative the polyesterification is carried out as a bulk polymerisation in the melt, whereby water formed as a condensation product can be removed by leading a dry inert gas into the polymer melt with simultaneous mixing. Abstraction of water can also be improved by using vacuum, whereby the pressure is decreased step-wise. According to one favourable alternative the polyesterification is started at a temperature of about 90° C., which is gradually increased to 180° C. The pressure is correspondingly decreased step-wise between 500 and 30 mbar, and the condensation water is continuously removed by nitrogen. At the end of the polyesterification the fraction with a low molar mass can be removed, if desired, from the reaction mixture by decreasing the pressure further, whereby the aforementioned fraction is distilled off.

The polyesterification is preferably performed in the presence of a catalyst, whereby according to one preferable embodiment the catalysts used are typical polyesterification catalysts. Such catalysts are, e.g., salts, or alkyl or alkoxy compounds of aluminium, iron, tin, titanium or zinc.

A polyester resin prepared in the way as described above can further be blended with well-known fillers, reinforcements and thixotropic materials. Typical fillers and reinforcing agents are talcum, wollastonite, chalk, glass, bioactive glass, hydroxy apatite, quartz and silicates, wood flour, jute, hemp, cellulose, starch, cotton, flax, graphite, aluminium hydroxide, carbon black and different pigments such as titanium dioxide. Further, to a polymer according to the invention can be blended bioactive glass, hydroxyl apatite, carbon nanofibers, nanoclays such as montmorillonite or microsilica.

The polyester resins flow rather easily especially on vertical surfaces if they do not have thixotropic properties. The most common agent giving thixotrophy is a specially made silicon dioxide. Its effect is based on hydrogen bridges between the hydroxyl groups of silicon dioxide and the polyester molecules. These hydrogen bridges increase the viscosity of the resin when the resin is not handled, and thus the flowing is decreasing. Thixotropic additives make the cured resin slightly opaque.

Crosslinking of a low molar mass resin to a high molar mass polymer changes, and usually improves, its physical properties compared to the uncured resin. Especially the temperature range of the polymer is widened, and the barrier properties are improved. The improved properties are especially seen above the glass transition temperature. Crosslinking of the resin as described in the invention can be performed by forming from the resin a polymer film by any known film formation method and equipment, which is suitable for making a polymer film (extrusion, dispersion, spray coating), or by making a formed object using the earlier mentioned traditional processing methods for thermoset resins, such as compression and transfer moulding, RIM injection moulding and pultrusion. Alternatively a film can be made on the surface of the material to be coated, such as paper, cardboard, wood, polymer, glass, metal or other material, by any known film formation method and equipment, which is suitable for making a polymer film on the surface of a material (extrusion, dispersion, spray coating). The resin may be cured by heat, light, by radiation or a combination of these in an apparatus adapted for this. The curing can take place immediately after film formation before application, or after application.

In the curing method described in the invention, the reaction of the double bonds of the resin, or the crosslinking, is initiated by producing radicals in the resin using different radical forming compounds for example organic peroxy compounds, such as diazyl peroxides, peroxy esters, peroxy dicarbonates, monoperoxy carbonates, diperoxy ketals, dialkyl peroxides, sulfonyl peroxides, ketone peroxides, and, peroxy carboxylic acids. Examples could be dibenzoyl peroxide, di(2,4-dichlorobenzoyl)peroxide, di-t-butyl peroxide, diacetyl peroxide, dilauroyl peroxide, didekanoyl peroxide, di-isononanoyl peroxide, succinic acid peroxide, acetyl cyclohexanesulfonyl peroxide, m-chloroperbenzoic acid, tert-butyl perbenzoate, tert-amylperbenzoic acid, and tert-butylperoxy maleic acid. Further inorganic peroxides can be used, e.g. hydrogen peroxide, oxygen, ozone, azo compounds, redox initiators, light initiators, polymeric peroxides, and other means to produce radicals and combinations of these.

In the curing method of this invention curing temperatures that can be used may be ambient or higher depending on the mechanisms of radical formation.

By the embodiment of this invention the curing of the resin can be speeded up and the curing temperature be decreased by adding accelerators before curing of the resin. Accelerators that can be used are, e.g., metal compounds, such as cobalt compounds, organic amines or other known accelerators. Accelerators, such as cobalt octoate and naphthenate, and amine accelerators can be used dissolved either in a suitable plasticiser or solvent or as such. A typical dosing is 0.015 ... 0.06 weight % cobalt or other metal, and 0.1 ... 0.4 weight % amine, depending on the degree of acceleration and the resin quality.

By the embodiment of the invention the reactions of the double bonds of the resin, or crosslinking sensitivity and rate, can be adjusted by the use of inhibitors already in the condensation polymerisation, or these can be added to the resin after the condensation polymerisation The inhibitors react with the radicals forming inactive molecules. By this premature curing of the resin is hindered and the working time is prolonged. After the inhibitors are exhausted (or reacted with the radicals) polymerisation and curing of the resin commences.

By the embodiment of the present invention, in the manufacture of the crosslinked biodegradable polymer coating the polymer resin can be cured by letting its double bonds react with each other, that is by homopolymerisation, as described above or alternatively possible mechanism is based on a reaction of double bond with hydrogen from the polymer chain and formation of new carbon-carbon bond. Additionally, curing can be achieved also by using a reactive macromonomer together with the polymer resin, whereby the double bonds of the different compounds react with each other forming a crosslinked polymer with a network structure. By using a reactive monomer, or reactive macromonomer, together with the polymer resin as according to the method, of this invention, the crosslink density can be affected and elastic, rubber like materials can be achieved, and the viscosity of the resin can be reduced.

In the embodiment of the invention rather low molar mass unsaturated polyester resins can be used as reactive macromonomers. These elastic resins of linear structure can be prepared by copolymerising difunctional alcohols, such as butanediol (BD), lactic acid (LA), itaconic acid (IT) and f.-caprolactone (CL) in a condensation reaction. Thereby a polyester resin is achieved, which is composed of the following structural units, however, not excluding other possible structures:

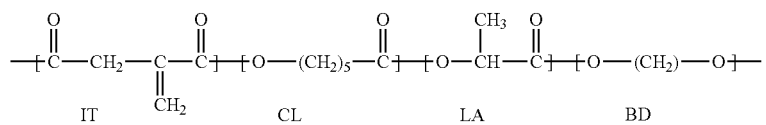

The present invention is described in more detail by the following examples.

Example 1

Preparation of a Star Shaped Poly(Lactic Acid-Itaconic Acid) Resin

Into a 2 liter Rotavapor equipment, used as the reactor, 437.5 g of L-lactic acid was added (88% water solution corresponding to 89 mole-%), 47.9 g of itaconic acid (9 mole-%), 14.5 g of pentaerythritol (2 mole-%) and 0.19 g of tin(II) octoate. Dry nitrogen was led into the reactor and a 500 mbar absolute pressure was established. The reactor vessel was partly immersed in an oil bath with a temperature of 90° C. The temperature of the oil bath was increased at a rate of 30° C./h to 120° C., and the reaction mixture was mixed by starting the rotation at a speed of 100 rpm. The temperature of the oil bath was evenly increased by 15° C./h until 180° C., where it was kept until the end of the polymerisation. The pressure was decreased every hour by the following steps: 500 (start)—500-450-400-350-290-190-140-90-60-50-40-30 mbar, at which pressure it was kept to the end of the polymerisation. Bubbling of nitrogen was continued throughout the polymerisation and the formed water was collected as it evolved. Total polymerisation time was 24 hours.

During the polymerisation no lactide was formed on the reactor walls, condenser or receiver, although lactide typically forms in a condensation polymerisation of lactic acid. The molar mass of the obtained polymer was analysed with a SEC equipment (Size Exclusion Chromatography), and the number average molar mass ($M_n$) was measured as 1500 g/mole, and the weight average molar mass ($M_w$) as 3900 g/mole, compared with polystyrene standards, and thus the molar mass distribution was 2.6. DSC analysis (Differential Scanning calorimetry) revealed, that the glass transition temperature of the polymer was 33° C., and no melting peak, of crystals was observed, so the polymer was completely amorphous. By using FTIR (Fourier Transform Infrared Spectroscopy), characteristic peaks of both double bonds (1640 cm$^{-1}$) and ester bonds (1750 cm$^{-1}$) were seen in the polyester resin.

Example 2

Preparation of a Star Shaped Poly(Lactic Acid-Itaconic Acid-ε-Caprolactone) Resin The polymerisation was performed like in Example 1, but the amounts of the ingredients were 846.3 g of aqueous L-lactic acid (86 mole-%), 66.2 g of itaconic acid (6 mole-%), 67.4 g of ε-caprolactone (6 mole-%), 20.1 g of pentaerythritol (2 mole-%) and 0.39 g of tin(II) octoate, and the polymerisation time was 26 hours.

The $M_n$ value of the obtained polymer was 2300 g/mole, measured with the SEC equipment, and its $M_w$ value 7100 g/mole compared to polystyrene standards, and thus the molar mass distribution was 3.1. DSC analysis revealed that the glass transition temperature of the polymer was 26° C., and no melting peak was observed. By using FTIR (Fourier Transform Infrared Spectroscopy) peaks characteristic of both double bonds (1640 cm$^{-1}$) and ester bonds (1750 cm$^{-1}$) were observed in the polyester resin.

Example 3

Preparation of a Star Shaped Poly(Lactic Acid-Itaconic Acid-ε-Caprolactone) Resin The polymerisation was performed like in Example 1, but the amounts of the ingredients were 794.7 g of aqueous L-lactic acid (81 mole-%), 72.5 g of itaconic acid (7 mole-%), 110.7 g of ε-caprolactone (10 mole-%), 22.0 g of pentaerythritol (2 mole-%) and 0.39 g of tin(II) octoate, and the polymerisation time was 26 hours.

The $M_n$ value of the obtained polymer was 2800 g/mole, measured with the SEC equipment, and its $M_w$ value 7600 g/mole compared to polystyrene standards, and thus the molar mass distribution was 2.7. DSC analysis revealed that the glass transition temperature of the polymer was 18° C., and no melting peak was observed. By using FTIR (Fourier Transform Infrared Spectroscopy) peaks characteristic of both double bonds (1640 cm$^{-1}$) and ester bonds (1750 cm$^{-1}$) were observed in the polyester resin.

Example 4

Preparation of a Linear Poly(Lactic Acid-Itaconic Acid) Resin

The polymerisation was performed as in Example 1, but the amounts of ingredients were 401.0 g of aqueous lactic acid (82 mole-%), 54.9 g of itaconic acid (9 mole-%), 44.1 g of 1,4-butanediol (9 mole-%) and 0.22 g of tin(II) octoate, and the polymerisation time was 27 hours.

The $M_n$ value of the obtained polymer was 2100 g/mole, measured with the SEC equipment, and its $M_w$ value 4100 g/mole compared to polystyrene standards, and thus the molar mass distribution was 1.9. DSC analysis revealed that the glass transition temperature of the polymer was 9° C., and no melting peak was seen. By using FTIR (Fourier Transform Infrared Spectroscopy) peaks characteristic of both double bonds (1640 cm$^{-1}$) and ester bonds (1750 cm$^{-1}$) were observed in the polyester resin.

Example 5

Preparation of a Reactive Macromonomer

The polymerisation was performed as in Example 1, but the amounts of the ingredients were 55.7 g of aqueous L-lactic acid (13 mole-%), 121.9 g of itaconic acid (25 mole-%), 248.3 g of ε-caprolactone (50 mole-%), 74.1 g of 1,4-butanediol (13 mole-%) and 0.18 g of tin(II) octoate, the polymerisation time being 26 hours.

Using the SEC apparatus it was determined that the $M_n$ value of the obtained polymer was 3000 g/mole and the $M_w$ value 9200 g/mole, compared to polystyrene standards, and thus the molar mass distribution was 3.1. DSC analysis gave a glass transition temperature of −49° C., and no melting peak was observed:

Example 6

Crosslinking of a Poly(Lactic Acid-Itaconic Acid) Resin Using a Reactive Macromonomer To the polyester resin according to Example 1, an amount of 20 weight % of the macromonomer according to Example 5 was blended in a melting mixer at a temperature of 90° C. for two minutes, after which 2 weight % di-tert-butylperoxide (Trigonox B) was added. After two minutes of mixing 1 mm thick films were compression moulded at 175° C. The films were cured in a heating chamber at a temperature of 125° C. for 1, 2 and 4 days, whereby a degree of crosslinking of 89% (1 day), 86% (2 days), and 91% (4 days) were obtained. The glass transition temperatures of these crosslinked polymers were 33° C., 39° C. and 42° C., respectively.

Example 7

Crosslinking of a Poly(Lactic Acid-Itaconic Acid) Resin Using a Reactive Macromonomer To the polyester resin according to Example 1 (80 weight %) the macromonomer according to Example 5 (20 weight %) was blended in a melting mixer at a temperature of 90° C. for two minutes, after which 2 weight % di-tert-butylperoxide (Trigonox B) was added. After two minutes of mixing a 1 mm thick film was compression moulded at 175° C. The films were cured at a temperature of 175° C. for 12 minutes, yielding a degree of crosslinking of 85%. The modulus, tensile strength and elongation of the cured film were 31 MPa, 6 MPa and 148%, respectively.

Example 8

Use of a Reactive Macromonomer at Crosslinking of a Poly(Lactic Acid-Itaconic Acid) Resin Cardboard Coating To the polyester 1 (80 weight %) was blended the reactive macromonomer 1 (20 weight %) in a melting mixer at a temperature of 90° C. for two minutes, after which 2 weight % di-tert-butylperoxide (Trigonox B) was added. After 2 min mixing a cardboard was coated with the polymer and cured in a compression mould at 175° C. for 1, 3, 6 and 12 min. The formed coatings were clear, had a hard surface and were flexible.

Example 9

Preparation of the Itaconic Acid Containing Resin without Reduced Pressure

Preparation of a star-shaped poly(lactic acid-itaconic acid) resin. Reaction was performed in a 250 ml glass reactor where was added 227.8 g of aqueous L-lactic acid (88% water solution corresponding to 88 mole-%), 27.2 g of itaconic acid (8 mole-%), 13.6 g of pentaerythritol (4 mole-%) and 0.1 g of tin(II) octoate. Into the reaction vessel was led nitrogen and it was immersed partly into the oil bath with temperature of 90° C. and the mixing was start at a speed of 200 rpm. The temperature was increased at a rate of 25° C./h to 150° C. The temperature was evenly increased at a rate of 15° C./h to 180° C., where it was kept during the whole polymerisation. Bubbling of nitrogen was continued throughout the polymerisation and the formed water was collected as it evolved. Total polymerisation time was 11 hours. The product resin was hard, clear but brittle, yellowish in colour and it was observed to crosslink by radicals.

Example 10

Elastic Version of Example 9

Preparation of poly(lactic acid-itaconic acid-ε-caprolactone) resin. Polymerisation was performed as in the Example 10, but the amounts of the ingredients were 113.6 g of aqueous L-lactic acid (71 mole-%), 12.3 g of itaconic acid (6 mole-%), 6.4 g of pentaerythritol (3 mole-%), 35.7 g of ε-caprolactone (20 mole-%) and 0.05 g of tin(II) octoate. Total polymerisation time was 17 hours. The product resin was sticky, elastic, rubbery, yellowish in colour and it was observed to crosslink by radicals.

Example 11

End-Functionalisation

Preparation of methacrylated poly(lactic acid-itaconic acid) resin. Reaction was performed in a 250 ml reaction vessel, whereat was added 128.3 g of the polyester resin according to Example 9 (80 wt-%) and 25.7 g of methacrylic anhydride (20 wt-%). Nitrogen was led to the reaction vessel and it was partly immersed in an oil bath with a temperature of 90° C. The temperature of the reaction mixture was increased to the temperature of 160° C. during half an hour and was kept there during 3 hours with mixing speed of 200 rpm. Hard brittle resin was obtained which was observed to crosslink easily by radical, redox and photo initiators.

Example 12

Preparation of Linear Poly(Lactic Acid-Itaconic Acid-Betulin) Resin

Polymerisation was performed in the same principle as in Example 9, but the betulin was added to the reaction mixture in three portions during first two hours. The amounts of the ingredients were following: 85.2 g of L-lactic acid (89 mole-%), 7.4 g of itaconic acid (5.5 mole-%), 25 g of betulin (5.5 mole-%) and 0.0375 g of tin(II)octoate. Total polymerisation time was 14 hours. The product was hard, brittle, shiny, orange mass, which was water resistant. Synthesis product was observed to crosslink with end-functionalisation (Example 11) by radicals.

Example 13

Preparation of Star-Shaped Poly(Lactic Acid-Itaconic Acid-Betulin) Resin

Polymerisation was performed as in Example 3, but the amounts of ingredients were following: 85.2 g of L-lactic acid (78 mole-%), 25.9 g of itaconic acid (16.5 mole-%), 1.4 g of pentaerythritol (0.8 mole-%), 25 g of betulin (4.7 mole-%) and 0.0375 g of tin(II)octoate. Total polymerisation time was 20 hours. As product, was obtained hard brittle brownish yellow mass, which was end-functionalised according to the example 11 and finally crosslinked by radicals.

Example 14

Preparation of Star-Shaped Poly(Lactic Acid) Resin

Polymerisation was performed as in Example 8, but the amounts of ingredients were 227.3 g of L-lactic acid (99 mole-%), 3.1 g of pentaerythritol (1 mole-%) and 0.1 g of tin(II)octoate. Time of polymerisation was 19 hours. As product, was obtained clear hard and brittle mass; which as end-functionalised according to Example 11 crosslinked by radicals to hard, and both water and grease resistant material.

Example 15

Crosslinking a Film by Heat

To a polyester resin according to Example 8 was blended 2 wt-% of bis(tert-butylperoxyisopropyl)benzene (Perkadox 14) in a melting mixer at a temperature of 80° C. After two minutes of mixing the blend was compression moulded to 2 mm thick films using 125, 135, 170° C. crosslinking temperatures, whereat 30, 35, 45 wt-% crosslinking degrees alias gel contents were obtained, respectively. In all conditions, the obtained products were crosslinked mechanically hard plastic-like material.

Example 16

Crosslinking Using a Reactive Macromonomer

To a polyester resin according to Example 1 was blended 5 wt-% of 1,4-butanediol-dimethacrylate and 2 wt-% of bis(tert-butylperoxyisopropyl)benzene (Perkadox 14) in a melting mixer at a temperature of 80° C. After two minutes of mixing the blend was compression moulded to 2 mm thick films at a temperature of 170° C. using times 6, 8, 12 min whereat 36, 37, 42 wt-% crosslinking degrees alias gel contents were obtained.

Example 17

To a polyester resin according to Example 11 was blended 1 wt-% of bis(tert-butylperoxyisopropyl)benzene (Perkadox 14) in a melting mixer at a temperature of 70° C. After two minutes of mixing the blend was compression moulded to 2 mm thick films at a temperature of 150° C. using time of 2 min whereat 85 wt-% crosslinking degree alias gel content was obtained. Crosslinked polymer was clear, smooth at surface and extremely tough, in addition, it was observed to resistant to water and oily compounds.

Example 18

Fiber Glass Composite

To a polyester resin according to a Example 11 was blended 1 wt-% of bis(tert-butylperoxyisopropyl)benzene (Perkadox 14) in a melting mixer at a temperature of 70° C. during 2 minutes. The mixture was impregnated into glass fiber mat by compression mould using processing temperature of 80° C. The plate was cured at 150° C. for 1, 2, 3 minutes. The composite contained 60 wt-% of polyester resin and 40 wt-% of glass fiber. The crosslinked composite was extremely tough and stiff, smooth and clear at the surface.

Example 19

Cotton Composite

Composite of polyester resin and cotton was prepared as in Example 18, but the cotton was used instead of the glass fiber. Different composites was prepared by adding the amount of cotton layers, 2-, 3-, 4-, 6-, 8-layered plates, whereat the polyester resin impregnated through the cotton layers entirely. Composite plates were smooth at the surface, and tough and stiff.

Example 20

Composite with Bioactive Glass

To an end-functionalised polyester resin according the Example 11 was blended 20 wt-% of bioactive glass in a melt mixer at the temperature of 70° C. for 1 minute and 1 wt-% of bis(tert-butylperoxyisopropyl)benzene (Perkadox 14) was added and the mixing was continued another 2 minutes. From the mixture was compression moulded 2 mm thick films at 160° C. for 1 min whereat an even hard composite plate was obtained which is resistant to water and oily compound.

Example 21

Cellulose Fiber Composite

To an end-functionalised polyester resin according the Example 11 was blended 1 wt-% of bis(tert-butylperoxyisopropyl)benzene (Perkadox 14) in a melt mixer at the temperature of 70° C. for 2 minute. The mixture was impregnated to hard cellulose board by compression mould using processing temperature of 80° C. The plate contained 85 wt-% of polyester resin and 15 wt-% of cellulose. The crosslinking was done at 150° C. for 2 minutes. The surface of the plate was smooth and clear, in addition, the plate was hard and persistent.

Example 22

Compression Moulding with Cup Mould

To a methacrylated polyester resin according the Example 11 was blended 20 wt-% of chopped glass fiber in a melt mixer at the temperature of 70° C. for 2 minute, 1 wt-% of bis(tert-butylperoxyisopropyl)benzene (Perkadox 14) was added and the mixing was continued for 1 minutes. Some of the resin mixture was put into Teflon cup mould and the mould was put in the oven at 80° C. for 5 minutes. The other part of the mould was pressed on top of the mould which was in the oven. The crosslinking was done by keeping the mould system in the heating chamber at 160° C. 5 minutes, whereat a hard and smooth surfaced, water and grease resistant cup was produced.

Example 23

Gluing the Steel Plates

To an end-functionalised polyester resin according the Example 11 was blended 1 wt-% of bis(tert-butylperoxyisopropyl)benzene (Perkadox 14) in a melt mixer at the temperature of 70° C. for 2 minute. The mixture was applied as a melt on the surface of the steel plate; the other plate was pressed on the top of the melt resin. The crosslinking was performed in the heating chamber, where the layer plate was held at 160° C. for 5 minutes.

Example 24

Redox Crosslinking

A resin according to Example 10 was end-functionalised according to Example 11. To the methacrylated polyester resin was blended 1.1 wt-% of dibentsoyl peroxide and 2 wt-% of N,N-dimethyl-p-toluidine at room temperature. After 1.5 hours a crosslinked elastic and stiff polyester resin was produced.

Example 25

Photocuring

To an end-functionalised polyester resin was added 2 wt-% of camphorquinone and 2 wt-% of N,N-dimethylaminoethylmethacrylate. The mixture was photocured by using a photoinitiator applying blue light for 40 seconds (wave length 400-500 nm) and a crosslinked, tough and stiff plastic alike material was obtained as a product.

Example 26

Dispersion 25 wt-% of a polyester resin according to Example 11 with 1 wt-% of blended bis(tert-butylperoxyisopropyl)benzene (Perkadox 14) was blended in hot water by adding it gradually as a melt during vigorous mixing with the help of surfactant natriumdodecylsulphate. The mixing was continued for 2 minutes and the mixture was cooled down. A milky dispersion was obtained which remain stable. This dispersion was applied on the surface of paper. The paper was put in the heating chamber at 160° C., where water evaporated and a thin crosslinked polymer film was produced on the paper surface.

Example 27

Veneer

A polyester resin according to Example 11 was applied on the surface of veneer boards. Five boards were placed on top of each other and pressed against each other by compression mould at a temperature of 150° C. for 5 minutes. A multi-layered veneer-like plate was obtained.

The invention claimed is:

1. A crosslinked polymer derived from biodegradable or biomass based starting materials, characterized in that it is composed of
   a. structural units derived from lactic acid or other aliphatic or aromatic α-hydroxy acid monomers, or mixtures thereof, and
   b. a functionalisation agent, which is pentaerytritol or other at least trifunctional alcohol or at least trifunctional carboxylic acid, and
   c. an unsaturated difunctional monomer, which is itaconic acid or another comonomer which has, in addition to reactive end groups, at least one reactive double bond in its molecule, and
   d. an optional properties modifying comonomer which is a caprolactone, and
   e. a carboxylic acid, a derivative of an organic acid or a monofunctional alcohol which has a reactive double bond or a reactive end-group in its molecule, and is prepared from said components stepwise first by polycondensing a monomer mixture being composed at 60-97 mole-% of monomer units a, 0.5-15 mole-% functionalisation agent b, 0.1-39.5 mole-% unsaturated difunctional monomer c, and 0-39.4 mole-% properties modifying comonomer d, and then by adding into the mixture 0.5-60 mole-% component e which reacts partly or entirely with the end-groups of the prepolymer thus formed, which has a number average molar mass of 200-50,000 g/mole, whereafter the final product is produced by crosslinking.

2. A crosslinked polymer according to claim 1, characterized in that the hydroxy acid based part a is comprised of L-lactic acid, D-lactic acid, or mixtures thereof, and the optional properties modifying comonomer d is ε-caprolactone, of which a is used alone or in mixtures with d.

3. A crosslinked polymer according to claim 1, characterized in that the part of its structural units derived from hydroxyl acid monomers and optional properties modifying monomer is composed of 100-50 mole-% of component a and 0-50 mole-% of component d.

4. A crosslinked polymer according to claim 1, characterized in that the unsaturated difunctional monomer c is comprised of itaconic acid, maleic acid, fumaric acid or their anhydrides, or 1,4-butenediol, 1-propene-1,2-diol, 2-heptene-1,7-diol, 3-heptene-1,7-diol, 2-hexene-1,6-diol, 3-hexene-1,6-diol, 1-pentene-1,5-diol, 2-pentene-1,5-diol or betulin alias betulinol, or mixtures thereof.

5. A crosslinked polymer according to claim 1, characterized in that the functionalisation agent b is comprised of erythritol, pentaerythritol, mannitol, glycerol or different polyglycerols or betulinol, each alone, or mixtures thereof.

6. A crosslinked polymer according to claim 1, characterized in that the functionalisation agent b is comprised of 1,1,3-propanetricarboxylic acid, 1,1,2-ethanetricarboxylic acid, or 1,2,3,4-cyclopentane-tetracarboxylic acid, or mixtures thereof.

7. A crosslinked polymer according to claim 1, characterized in that the component e used in the treatment of end-groups of the prepolymer before the crosslinking step is a carboxylic acid, a derivative of an organic acid or a monofunctional alcohol which has a reactive carbon-carbon double bond or a reactive end-group in its molecules.

8. A crosslinked polymer according to claim 1, characterized in that the acid or the compound e derived from an organic acid used in the treatment of end-groups is a carboxylic acid, a fatty acid, an organic acid anhydride or acid chloride, preferably octyl succinic anhydride, methacrylic acid, methacrylic anhydride, itaconic acid, itaconic acid anhydride, linolenic acid, risinolenic acid, or a mixture thereof.

9. A crosslinked polymer according to claim 1, characterized in that the acid or the compound e derived from an acid in the treatment of end-groups of the prepolymer is presented by a general formula

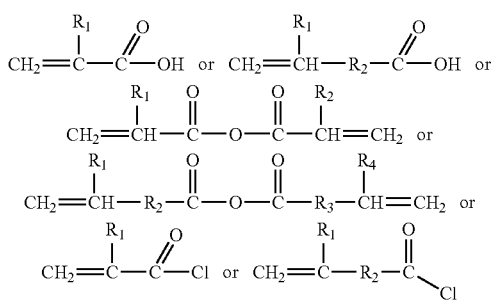

or a combination of these, where $R_1$, $R_2$, $R_3$ and $R_4$ are hydrogens, some saturated hydrocarbon chains, or other chemical groups.

10. A crosslinked polymer according to claim 1, characterized in that the components a, b, c, and d are based on renewable raw materials, or biotechnically prepared.

11. A crosslinked polymer according to claim 1, characterized in that the molecular structure of the prepolymer is branched, or star-shaped, before curing, and it forms a crosslinked network after curing.

12. A crosslinked polymer according to claim 1, characterized in that it can be crosslinked by using radical producing chemical compounds which can be peroxides, azo compounds, or redox compounds, or using heat, heat radiation, ultraviolet radiation, X-ray radiation, gamma radiation or electron radiation.

13. A crosslinked polymer according to claim 1, characterized in that the optional properties modifying monomer d is ε-caprolactone, betulinol or itaconic acid.

14. A crosslinked polymer according to claim 1, characterized in that the final crosslinked polymer is elastic, or it has rubbery properties.

15. A crosslinked polymer according to claim 1, characterized in that, in addition to the treatment of end-groups of the prepolymer with the reactive compound e, the prepolymer is blended with a reactive comonomer, or a reactive oligomeric macromonomer, which improves the crosslinking.

16. A crosslinked polymer according to claim 1, characterized in that it is blended with fillers and reinforcement agents which are, selected from inorganic or organic compounds, preferably glass fibers, carbon fibers, polymer fibers, chalk, calcium carbonate, kaolin, mica, aluminium hydroxide, calcium oxide, $TiO_2$, carbon black, cellulose, paper mass, wood fibers, wood flour, wood groats, bark powder, chips, lignin, betulin, flax fibers, starch, nanofillers such as montmorillonite, nanofibers, silica or microsilica, hydroxy apatite, bioactive glass and xerogels, glass flours, porosity producing porogens, alone or in combination.

17. A method to produce a crosslinked polymer based on biodegradable or biomass based materials characterized in that it is produced stepwise first by
polycondensing a monomer mixture composed of:
(a) 60-97 mole-% lactic acid or structural units derived from other aliphatic or aromatic α-hydroxy acids, and
(b) 0.5-15 mole-% functionalization agent, which is pentaerytritol or other at least trifunctional alcohol or at least trifunctional carboxylic acid, and
(c) 0.1-39.5 mole-% unsaturated difunctional monomer, which is itaconic acid or other comonomer which has, in addition to reactive end-groups, at least one reactive double bond in its molecule, and
(d) 0-39.4 mole-% of an optional properties modifying comonomer which is caprolactone, to form a prepolymer having a number average molar mass of 200-50,000 g/mole,
and then treating the prepolymer with (e) 0.5-60 mole-% of a carboxylic acid, a derivative of an organic acid or a monofunctional alcohol which has a reactive double bond or a reactive end-group in its molecules, and which reacts partly or entirely with the end-groups of the prepolymer,
and then crosslinking to produce the crosslinked polymer.

18. A method according to claim 17 characterized in that the prepolymer is produced without reduced pressure or in reduced pressure at an elevated temperature.

19. A method according to claim 17 characterized in that the preparation of the prepolymer, and the reaction of its end-groups with component (e), is performed, batchwise or continuously, in any stirred vessel, thin film evaporator, or in cascade reactors with solvent or without solvent.

20. A method according to claim 17 characterized in that the crosslinking of the final product is obtained by a radical producing method using radical producing chemical compounds selected from the group consisting of peroxides, azo compounds and redox compounds, or by using heat, heat radiation, ultraviolet radiation, X-ray radiation, gamma radiation or electron radiation.

21. A method according to claim 17 characterized in that in addition to the treatment of end-groups of the prepolymer with component (e), the crosslinking is improved by blending the prepolymer with a reactive oligomeric macromonomer.

22. A method according to claim 17 characterized in that the crosslinking is carried out in a mould, in a press, on a continuous line, in deep drawing, in a film layer, in an impregnated mass or product, in a filler mixture, in conjunction with pultrusion or winding, in a lamination procedure, by gluing, in conjunction with surgery or dental care, or in a living tissue.

23. A method according to claim 17 characterized in that the prepolymer is, either as itself or after treating the end-groups with component e, spread as a coating, spread by a spraying technique as a liquid, spread by extrusion, pigment, hotmelt or wax coating techniques, spread by painting techniques, or is moulded to objects.

24. A method according to claim 17 characterized in that the prepolymer prepared with the method is, either as itself or after treating the end-groups with a compound carrying unsaturation in its molecules, processed by coating, painting, roll coating, dispersion coating, curtain coating, extrusion, spray coating, compression moulding, prepreg techniques, RTM techniques, deep drawing from prepreg, winding pultrusion, rotation casting, blow molding, or rubber processing.

25. A crosslinked polymer according to claim 1, characterized in that the prepolymer has a number average molar mass of 200-15,000 g/mole.

26. A method according to claim 18 characterized in that the prepolymer is produced at an absolute pressure of 1 bar at a temperature of 150-230° C.

27. A method according to claim 18 characterized in that the preparation of the prepolymer, and the reaction of its end-groups with component e is performed in cascade reactors without solvent.

28. A method according to claim 17 characterized in that the prepolymer prepared with the method is, either as itself or after treating the end-groups with a compound carrying unsaturation in its molecules, foamed so that the prepolymer is first made porous after which it is crosslinked to form a network structure.

* * * * *